(12) United States Patent
Arnold et al.

(10) Patent No.: US 7,607,691 B2
(45) Date of Patent: Oct. 27, 2009

(54) LOST CORE STRUCTURAL INSTRUMENT PANEL

(75) Inventors: Paul Arnold, LaSalle (CA); Spero Boutsikaris, Troy, MI (US)

(73) Assignee: Mahle International GmbH, Stuttgart (DE)

( * ) Notice: Subject to any disclaimer, the term of this patent is extended or adjusted under 35 U.S.C. 154(b) by 791 days.

(21) Appl. No.: 10/928,793

(22) Filed: Aug. 27, 2004

(65) Prior Publication Data

US 2005/0046164 A1  Mar. 3, 2005

Related U.S. Application Data

(60) Provisional application No. 60/558,865, filed on Apr. 2, 2004, provisional application No. 60/498,071, filed on Aug. 27, 2003.

(51) Int. Cl.
*B60R 21/04* (2006.01)

(52) U.S. Cl. .......................... 280/751; 280/752; 296/70

(58) Field of Classification Search ................. 280/750, 280/751, 752; 296/70, 72, 193.02, 901.01
See application file for complete search history.

(56) References Cited

U.S. PATENT DOCUMENTS

| | | | |
|---|---|---|---|
| 5,762,395 A | | 6/1998 | Merrifield et al. |
| 5,931,520 A | * | 8/1999 | Seksaria et al. ............... 296/70 |
| 5,965,468 A | * | 10/1999 | Marmon et al. ............. 442/340 |
| 5,979,965 A | * | 11/1999 | Nishijima et al. ............. 296/70 |
| 6,110,037 A | | 8/2000 | Yoshinaka |
| 6,176,544 B1 | * | 1/2001 | Seksaria et al. ........ 296/203.02 |
| 6,203,092 B1 | | 3/2001 | Yoshinaka |
| 6,250,678 B1 | | 6/2001 | Yoshinaka et al. |
| 6,325,440 B1 | * | 12/2001 | Emmerich .................... 296/70 |
| 6,447,041 B1 | * | 9/2002 | Vandersluis et al. ........... 296/72 |
| 6,497,432 B2 | * | 12/2002 | Scheib et al. ................ 280/779 |
| 6,648,402 B2 | * | 11/2003 | Scheib et al. .......... 296/203.02 |
| 6,676,202 B2 | | 1/2004 | Brancheriau |
| 6,761,395 B2 | | 7/2004 | Charbonnel |
| 6,988,764 B2 | * | 1/2006 | Matsutani .............. 296/193.02 |
| 7,000,969 B2 | * | 2/2006 | Baker et al. .................... 296/70 |
| 7,040,686 B2 | * | 5/2006 | Kapteyn ....................... 296/70 |
| 7,102,888 B2 | * | 9/2006 | Glovatsky et al. ........... 361/695 |
| 7,128,360 B2 | * | 10/2006 | Scheib et al. .................. 296/70 |
| 2002/0130529 A1 | | 9/2002 | Takano |
| 2004/0056463 A1 | | 3/2004 | Marks et al. |

\* cited by examiner

*Primary Examiner*—Toan C To
(74) *Attorney, Agent, or Firm*—Carlson, Gaskey & Olds

(57) ABSTRACT

A support structure for an automotive instrument panel includes a single unitary molded article fabricated from a lost core molding process. The support structure includes integrally formed support segments for knee bolsters. A plurality of air passages are formed from hollow cores within different segments of the support structure.

15 Claims, 5 Drawing Sheets

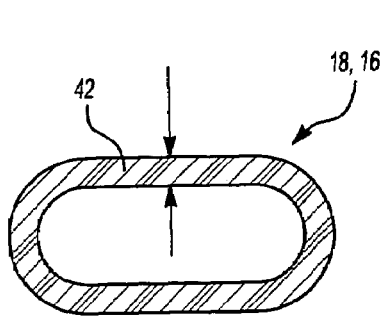
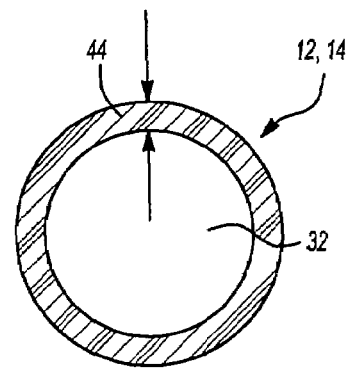
Fig-4
Fig-5
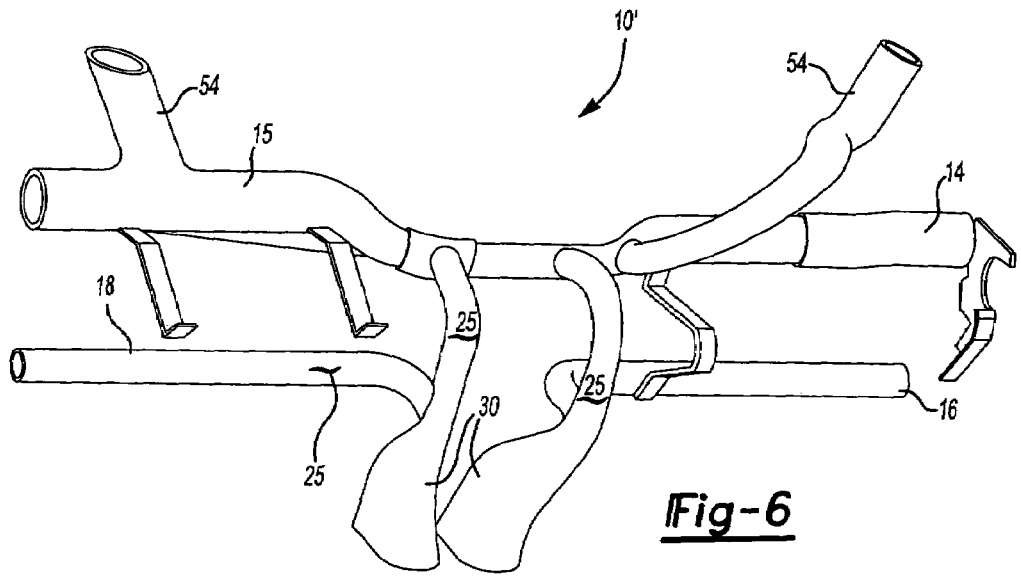
Fig-6
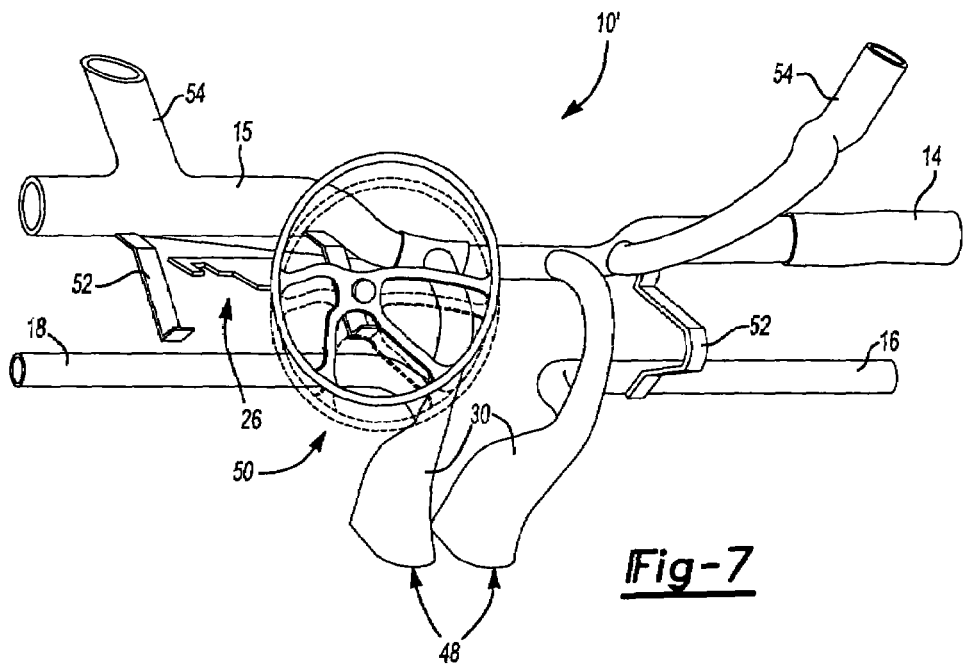
Fig-7

LOST CORE STRUCTURAL INSTRUMENT PANEL

The application claims priority to U.S. Provisional Application No. 60/558,865 that was filed Apr. 2, 2004 and U.S. Provisional Application No. 60/498,071 that was filed Aug. 27, 2003.

BACKGROUND OF THE INVENTION

Typically, a vehicle instrument panel and other vehicle controls are assembled within a dashboard. The dashboard is supported within the vehicle by a separate support beam that is attached within the vehicle. Typically, a steel support beam is attached within the vehicle to support assembly of heating and ventilating channels, airbag modules, car radios, and other devices. An increasing number of devices such as digital displays, global positioning systems, compact disc players are being included in automobiles. Preferably, such devices are installed within the instrument panel for the convenience of the occupants. However, space for these additional desired devices is limited.

Additionally, it is known to provide a support beam that utilizes plastic structures molded onto metal structures, or a plurality of separately molded plastic segments assembled to form a support for the vehicle dashboard. Assembling plastic parts to a metal beam requires many assembly and fabrication operations. Further, the use and assembly of a plurality of plastic parts requires many differently configured mold tools to separately form the many plastic parts.

Accordingly, it is desirable to design an instrument support structure that provides the requisite strength while reducing assembly time and costs.

SUMMARY OF THE INVENTION

This invention is a support structure for an automotive instrument panel that is formed from a plastic material having a plurality of air passages and at least one structure for supporting a knee bolster within a single unitary structure.

The support structure of this invention is fabricated utilizing a lost core molding technique. The use of the lost core molding technique provides for the definition and variation of internal and external features as desired to produce the integrally molded plastic instrument panel support structure of this invention. The support structure of this invention incorporates many conventionally separate items into a single unitary structure mountable within a vehicle. The support structure of this invention includes in a single unitary structure having many features and segments that increase available space for devices mounted within the dashboard. Further, the various segments and mounting structures combine to provide the desired strength, durability and rigidity of the support structure without reliance on a single structure.

Accordingly, the support structure of this invention provides a single unitary structure for supporting an instrument panel and various other devices within a dashboard.

These and other features of the present invention can be best understood from the following specification and drawings, the following of which is a brief description.

BRIEF DESCRIPTION OF THE DRAWINGS

FIG. 4 is a cross-sectional view of a segment for supporting a knee bolster.

FIG. 5 is a cross-sectional view of a segment of the support structure.

FIG. 6 is a perspective view of a support structure according to this invention.

FIG. 7 is a view of the support structure according to this invention including a steering column.

DETAILED DESCRIPTION OF THE PREFERRED EMBODIMENT

Figure 1:
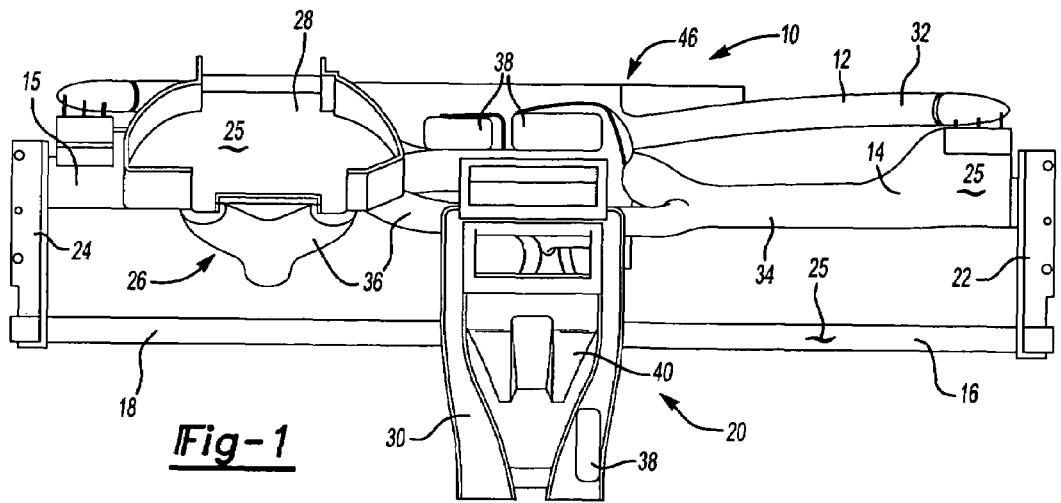
FIG. 1 is a front view of the instrument panel support structure of this invention.
Figure 2:
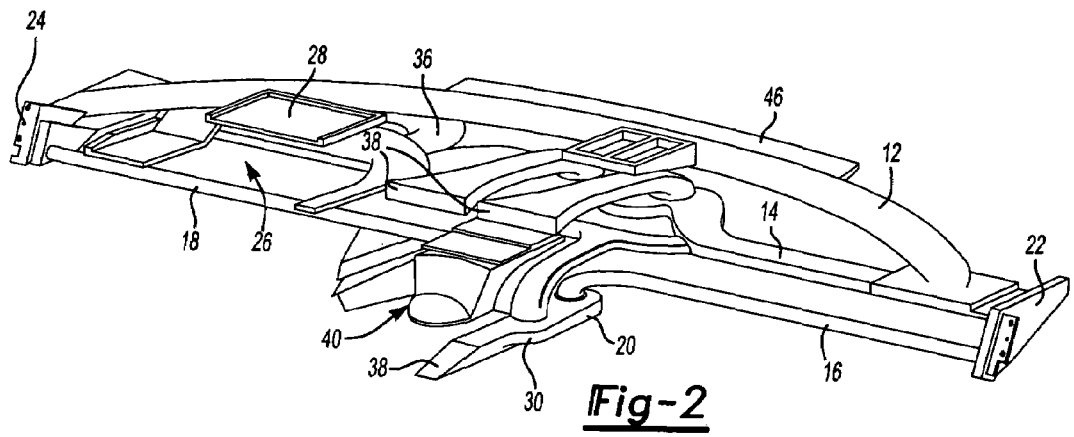
FIG. 2 is a perspective view of the support structure according to this invention.

Referring to FIGS. 1 and 2, a support structure 10 for an automotive instrument panel includes a first segment 12. The first segment 12 includes a hollow core that defines an air passage 32. The support structure 10 also includes an instrument-mounting segment 28. A first knee bolster support segment 16 and a second knee bolster support segment 18 are also integrally formed as part of the support structure 10.

The entire support structure 10 includes various structures that are formed as a single unitary molded structure. Further, the support structure 10 includes many different segments, mounting locations and features that are part of the single unitary structure. Each segment provides several functions along with contributing to the overall structural rigidity of the entire support structure 10. No one structure or segment bears the load, instead the entire support structure and it's various segments and mounting structures combine to provide the strength, durability and rigidity required for supporting various components commonly attached and secured within an instrument panel.

The first knee bolster support segment 16 and second knee bolster support segment 18 along with the instrument mounting segment 28 and the first segment 12 are features that share a common continuous exterior surface 25. The support structure 10 includes a plurality of air passages that are in communication with the hollow core air passage 32. A second segment 14 extends between a first flange member 22 and a center support structure 20. A third segment 15 extends from the center support structure 20 in a direction opposite the second segment 14 to a second flange member 24. Each of the flange members 24, 22 are integrally formed inserts molded with the support structure 10. The segments 12, 14, 15 are all hollow tubular members that define portions of air passages 34, 36 and 32. The air passages provide for communication of air from a heating ventilating and air conditioning system to various points within the interior of the vehicle.

The center support structure 20 includes a plurality of center air passages 30. The center support structure 20 provides a mounting location 40 for various devices such as car radios, instrument displays and various other controls. Integrally molded along with the segments 12, 14 and 15 is the instrument-mounting segment 28. The instrument-mounting segment 28 provides a surface for mounting of the electronic or other types of instrument cluster therein.

The air passages 32, 30, 34 and 36 within the support structure 10 are all integrally formed within the support structure 10. Each of the segments 12, 14 and 15 provide support and define passages for the flow of air into the vehicle. The support structure 10 defines a plurality of vents 38 that communicate air from the air passages into the interior vehicle environment.

The support structure 10 includes the first knee bolster support segment 16 and the second knee bolster support segment 18. The knee bolster support segments 16, 18 provide a mounting location for knee bolster devices that are as known in the art. As appreciated, the knee bolster device requires a support structure that includes desired strength and durability qualities that perform in a specific desired manner upon impact. The knee bolster support segments 16, 18 extend from the center support structure 20 to each of the opposing flange members 22, 24. The knee bolster support structures 16,18 are disposed at a location below the segments 12, 14, 15 to be in a desired location required to provide the protection to the vehicle occupant's lower extremities.

Figure 3:
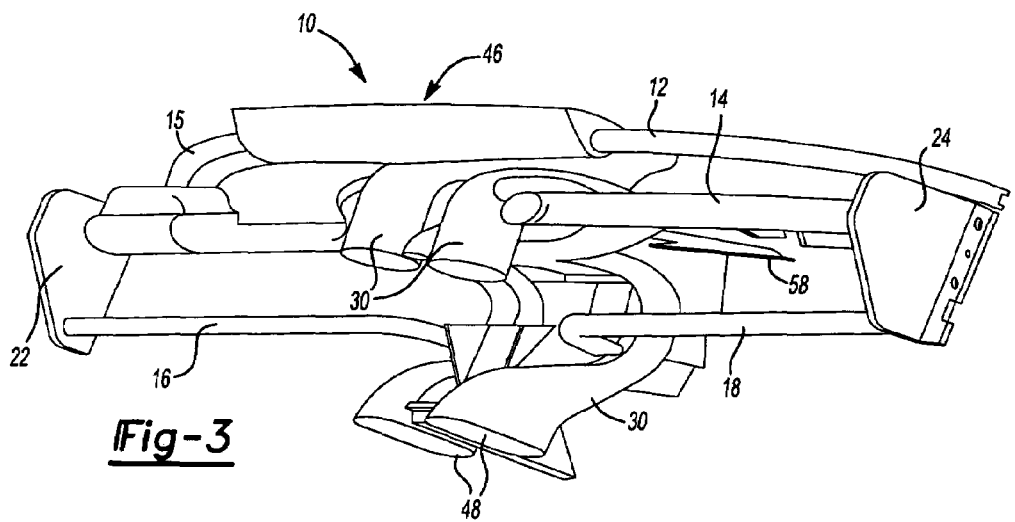
FIG. 3 is a rear view of the support structure according to this invention.

Referring to FIG. 3 the support structure 10 is shown from the rear, and includes vent portions 48. The first segment 12 extends substantially across the entire support structure 10 between the first flange member 22 and the second flange member 24. The first and second flange members 24 provide attachment points of the support structure 10 frame features of a vehicle body. The second segment 14 and the third segment 15 substantially comprise tubular members that extend from the various center air passages 30 to the flange members 24 and 22 disposed on opposite ends of the support structure 10. The tubular configuration of the segments 14 and 15 provide the desired strength required when mounting various devices to the support structure 10.

Further, the specific cross-sectional shape of each of the segments 12,14, and 15 varies depending on the specific function for a segment of the support structure. The cross-section of each of the segments 12, 14 and 15 varies throughout the entire support structure 10. By varying the cross-sectional shape of the segments 12, 14 and 15 the strength and mounting requirements for individual segments of each segment can be tailored to provide strength and mounting points for any desired device.

Referring to FIG. 4, a cross-section of one of the knee bolsters support segments 18, 16 is shown. The cross-section is substantially oval in shape and includes a wall thickness 42. The wall thickness 42 may vary over the length of each of the knee bolster support segments 18, 16. Further, the wall thickness 42 may vary about the circumference of the knee bolster support segments 18, 16. The oval cross-section is adapted in specific portions to provide the desired strength.

Referring to FIG. 5, a cross-section of an example portion of each of the segments 12, 14, and 15 is substantially circular. The cross-section includes a wall thickness 44. The wall thickness 44 can vary throughout each of the segments 12, 14, and 15 and is tailored at each specific portion to provide the desired characteristics of each segment. Further, although a circular cross-section is illustrated, a worker with the benefit of this disclosure would understand that other shapes are within the contemplation of this invention.

Referring to FIG. 6, another support structure 10' according to this invention includes the second segment 14 and the third segment 15. The second segment 14 and third segment 15 are a common structure that shares the common exterior surface 25 and provides a common air passage therethrough. The cross-section of each of the segments 14, 15 can change over the length from one end to another to tailor structural properties. Further shown is the configuration of knee bolster support segments 18, 16 as they extend from the center air passages 30 outwardly toward the distal ends of the support structure 10'. An additional air passage 54 extends from the second segment 14 and third segment 15 for communicating air to desired locations. The specific configuration of the air passage can be modified to provide air to other air passages 54 within the vehicle. The knee bolsters support segments 18 and 16 protect the lower extremities of a vehicle occupant by absorbing energy and blocking movement of the occupant.

Referring to FIG. 7, the support structure 10' is shown including a steering wheel 50 mounted at the steering mount portion 26. Brackets 52 are shown attached to the support structure 10' for fastening components of a dashboard. The brackets 52 are mounted to the support structure 10' to provide locations for various devices such as a glove compartment, wiring harness assembly, or other items commonly mounted within a vehicle.

Figure 8:
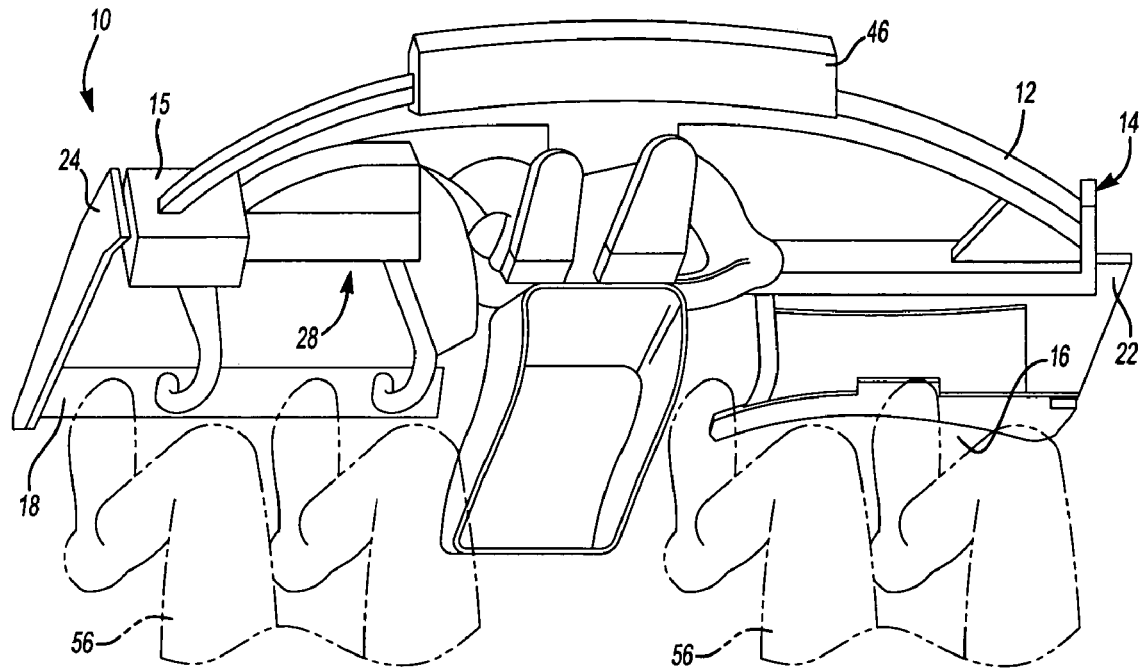
FIG. 8 is a top view of the support structure.

Referring to FIG. 8, a top view of the support structure 10 according to this invention including a schematic representation of vehicle occupants 56. The support structure 10 of this invention provides mounting locations of various parts of the dashboard and also provides specific structural safety features formed as an integral plastic piece without the use of additional metal structures. The support structure 10 of this invention eliminates additional elements by including the knee bolsters support segments 16,18 into a single unitary continuous molded article.

Figure 9:
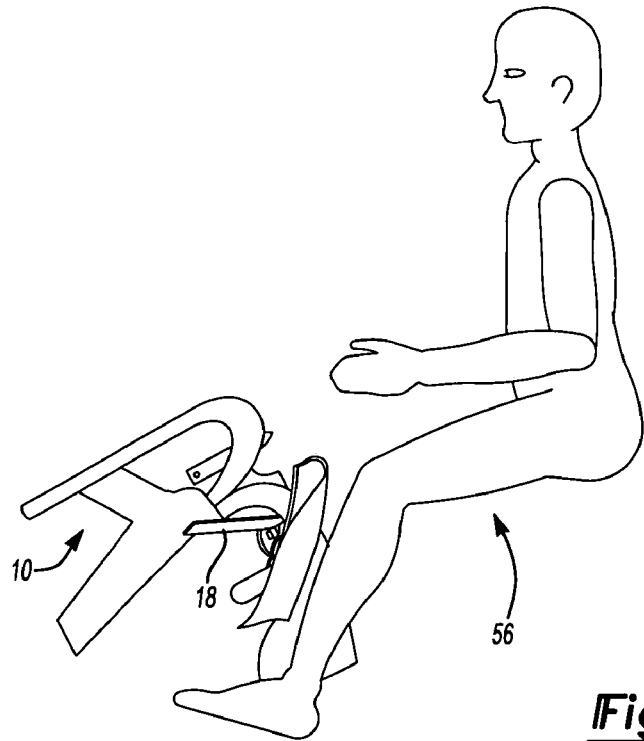
FIG. 9 is a side view of the support structure including the support segment for knee bolsters.

Referring to FIG. 9, a side view of the support structure 10 according to this invention is shown relative to lower extremities of a vehicle occupant 56. Impact with the knee bolster 18 prevents the vehicle occupant 56 from sliding under the dashboard and support structure 10. The knee bolster support segment 18 is a required structural safety element of a vehicle and is installed in vehicles according to stringent safety requirements. The knee bolster support segments 16, 18 of this invention are part of the single unified support structure 10.

Figure 10:
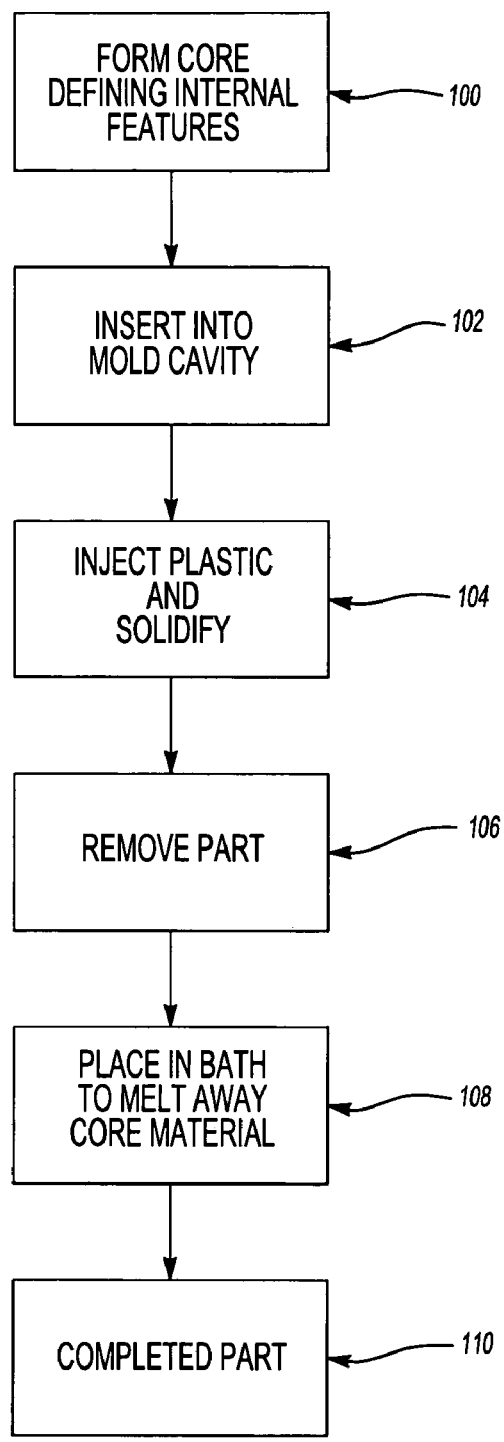
FIG. 10 is a flow diagram illustrating method steps for forming the support structure.

The support structure 10 is formed utilizing a lost core molding process. Referring to FIG. 10, a block diagram illustrates schematically the steps of the process. The lost core molding process provides for the fabrication of elements of varying wall thicknesses and cross-sectional shapes. The variations of wall thicknesses and cross-sectional shapes provides for the fabrication of knee bolster support segments 16, 18 and other structures from a single molded plastic part material that may otherwise require fabrication from heavier steel materials.

The lost core molding process includes the step 100 of first fabricating a core assembly. The core assembly is formed from a material that is meltable at a temperature less than the temperature at which the plastic material utilized for the part will melt once solidified. The core assembly is fabricated to define the internal features of the support structure 10. The internal features include the various air passageways, mounting openings, venting, and other mounting features of the support structure 10. The core also provides a means for varying the cross-sectional shape and wall thickness along each section of the support structure 10. This provides for the tailoring of both wall thickness and cross-section shape to requirements of specific segments of the support structure 10.

Once the core assembly is fabricated it is inserted into a mold cavity as indicated at step 102. The mold cavity includes a surface that defines the exterior surface of the support structure 10. The cavity interior surface operates in concert with the core assembly and defines the exterior surface of the support structure 10 to define the cross-sectional shapes and wall thicknesses for each segment of the support structure 10.

Molded plastic is introduced into the cavity and formed around the core structure to fill the cavity between the core and the interior surface of the mold tool as indicated at step 104. Once the plastic material has solidified, the part along with the core assembly is removed as indicated at 106 and allowed to cool. The molded article including the core is then inserted into a chamber for removal of the core as is indicated at 108. Typically, the core is removed in a bath of liquid that is at a temperature above the melting temperature of the core material but below the melting temperature of the plastic material forming the support structure 10. The core material melts and is drained from the support structure 10. The support structure 10 is then removed and forms the completed part as is indicated at 110 without substantial additional assembly steps or process.

The support structure 10 of this invention integrates many components into a single unitary part. Accordingly, after the support structure 10 core assembly is removed, it is substantially complete and ready for assembly into the vehicle. In this way, many manufacturing steps, costs and equipment can be eliminated to more efficiently produce the support structure 10 for a vehicle.

Figure 11:
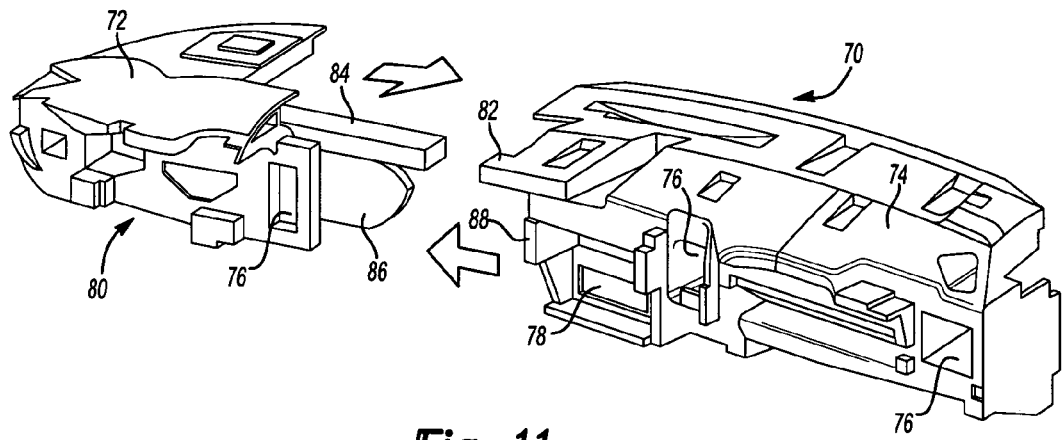
FIG. 11 is another support structure for an instrument panel according to this invention.

Referring to FIG. 11 another support structure 70 according to this invention is shown and includes a first half 72 joinable to a second half 74. As appreciated, a single unitary structure is desired in many circumstances. However, in some instances it may be desirable to form the support structure in two pieces that are matable to form the desired structure and inner passageways.

The support structure 70 includes vents 76 that are in communication with air passages 86 and 88. Further, support structure 70 includes mounting portions for the devices that are desirable to be mounted in the dashboard. An example of this is the mounting structure 78 for a radio or stereo. Additional mounting structures may also be included in the support structure 70 as is required by application specific requirements. An additional mount structure is provided at 80 for mounting of a steering column to the support structure 70. A worker versed in the art with the benefit of this invention would understand that various configurations of the support structure 70 are possible to provide for mounting of any number and type of devices.

The support structure 70 includes a first member 84 that is mountable and insertable into a second member 82. The first member 84 and second member 82 are combined and assembled to each other to form a complete segment for supporting the devices mounted within support structure 70.

Figure 12:
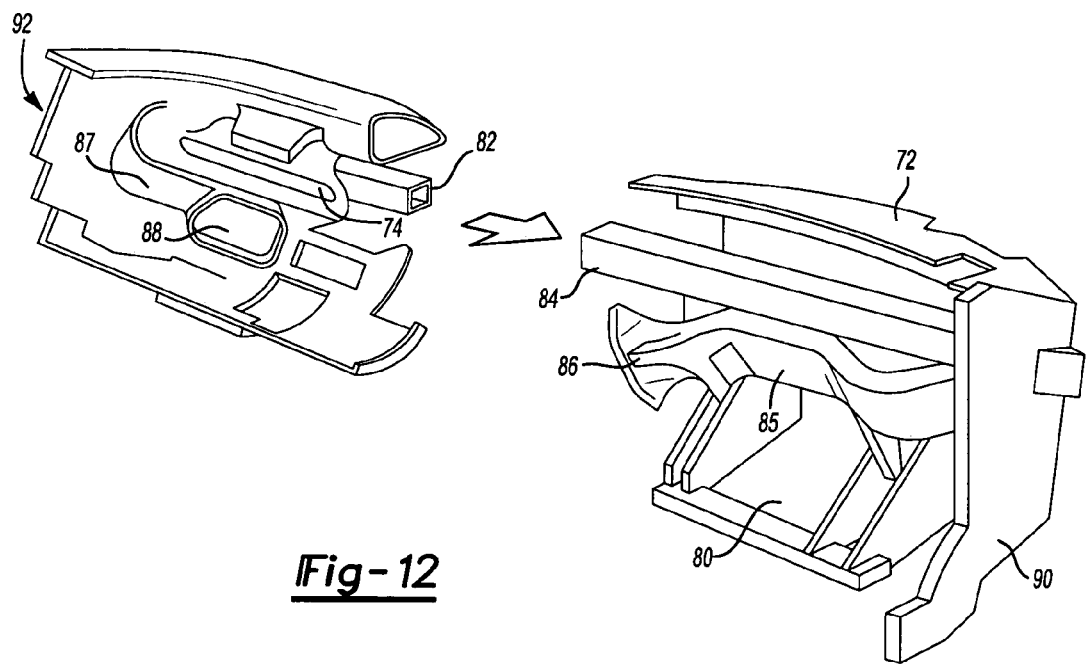
FIG. 12 is a rear view of the support structure illustrated in FIG. 11.

Referring to FIG. 12, a rear view of the support structure 70 is illustrated and includes the air passages 88 and 86 that are matable to one another upon interlocking of the first half 72 to the second half 74. The air passages 87 and 86 include the openings 88 and 86 that mate to form the continuous air passage between the first half 72 and second half 74. The first half 72 and second half 74 include mounting flanges 90 and 94 that are adaptable for mounting a support assembly 70 within a vehicle.

The support structure of this invention provides a lost core molded plastic article that includes various cross-sectional shapes tailored to the specific areas and requirements of the support structure 10. Further, the wall thicknesses are varied throughout the support structure 10 to accommodate strength requirements and to reduce weight.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A plastic support structure for an instrument panel comprising:
    a first segment having a hollow core defining an air passage;
    a support segment for an instrument panel; and
    at least one knee bolster support segment, wherein said first segment, said support segment and said at least one knee bolster support segment comprise a single unitary plastic molded article, said at least one knee bolster support segment including a substantially oval cross-section having a wall thickness that varies along a length of the knee bolster support segment.

2. The support structure as recited in claim 1, including a plurality of air passages in communication with said hollow core of said first segment.

3. The support structure as recited in claim 1, wherein said first segment includes a wall thickness, said wall thickness comprising at least two different thicknesses disposed within said first segment.

4. The support structure as recited in claim 1, wherein said oval cross-section comprises a circumferentially variable wall thickness.

5. The support structure as recited in claim 1, including a flange member disposed at opposite ends of said support structure.

6. The support structure as recited in claim 5, wherein said flange member is integrally formed to said support structure.

7. The support structure as recited in claim 1, including a center mount segment comprising a plurality of air passages and a mounting structure.

8. The support structure as recited in claim 7, wherein said center mount segment comprises a continuous portion of said first segment and said knee bolster support segment.

9. The support structure as recited in claim 1, including a steering column mount segment comprising a continuous portion of said support structure.

10. The support structure as recited in claim 1, wherein said support structure comprises a lost core molded article.

11. An instrument panel support structure comprising:
    a center support structure comprising a first plurality of air passages;
    a first knee bolster support segment extending laterally from said center support structure to a first flange member; and
    a second knee bolster support structure extending laterally in a direction opposite said first knee bolster support structure to a second flange member, wherein said center support structure and said first and second knee bolster support segments include a common continuous exterior surface; and
    a plurality of hollow segments forming a structure between a first end adjacent said first flange member and a second end adjacent said second flange member, wherein said center support structure and said first and second knee bolster support segments comprise a single unitary plastic molded article.

12. The support structure as recited in claim 11, wherein said plurality of hollow segments are in communication with said first plurality of air passages.

13. The support structure as recited in claim 11, wherein said first knee bolster support segment and said second knee bolster support segment comprises a substantially oval cross-section.

14. An instrument panel support structure comprising:
a center support structure comprising a first plurality of air passages;
a first knee bolster support segment extending laterally from said center support structure to a first flange member;
a second knee bolster support structure extending laterally in a direction opposite said first knee bolster support structure to a second flange member, wherein said center support structure and said first and second knee bolster support segments include a common continuous exterior surface;
a plurality of hollow segments forming a structure between a first end adjacent said first flange member and a second end adjacent said second flange member; and
a second plurality of air passages disposed on opposite sides of said center support structure.

15. An instrument panel support structure comprising:
a center support structure comprising a first plurality of air passages;
a first knee bolster support segment extending laterally from said center support structure to a first flange member;
a second knee bolster support structure extending laterally in a direction opposite said first knee bolster support structure to a second flange member, wherein said center support structure and said first and second knee bolster support segments include a common continuous exterior surface, said first knee bolster support segments and said second knee bolster support structure comprise a substantially oval cross-section include a wall having a thickness varying within said oval cross-section.

* * * * *

UNITED STATES PATENT AND TRADEMARK OFFICE
CERTIFICATE OF CORRECTION

PATENT NO.        : 7,607,691 B2                                           Page 1 of 1
APPLICATION NO. : 10/928793
DATED             : October 27, 2009
INVENTOR(S)       : Arnold et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Twelfth Day of October, 2010

David J. Kappos
*Director of the United States Patent and Trademark Office*